United States Patent
Chao Chang et al.

(10) Patent No.: US 6,567,778 B1
(45) Date of Patent: May 20, 2003

(54) NATURAL LANGUAGE SPEECH RECOGNITION USING SLOT SEMANTIC CONFIDENCE SCORES RELATED TO THEIR WORD RECOGNITION CONFIDENCE SCORES

(75) Inventors: Eric I Chao Chang, Fremont, CA (US); Eric G. Jackson, Menlo Park, CA (US)

(73) Assignee: Nuance Communications, Menlo Park, CA (US)

( * ) Notice: Subject to any disclaimer, the term of this patent is extended or adjusted under 35 U.S.C. 154(b) by 0 days.

(21) Appl. No.: 09/339,470

(22) Filed: Jun. 23, 1999

Related U.S. Application Data

(63) Continuation-in-part of application No. 08/576,874, filed on Dec. 21, 1995, now Pat. No. 6,292,764.
(60) Provisional application No. 60/091,047, filed on Jun. 29, 1998.

(51) Int. Cl.[7] ............................................... G10L 15/18
(52) U.S. Cl. ...................................... 704/257; 704/275
(58) Field of Search ................................. 704/257, 275

(56) References Cited

U.S. PATENT DOCUMENTS

| | | | | |
|---|---|---|---|---|
| 4,590,604 A | | 5/1986 | Feilchenfeld ................. 381/42 |
| 5,127,055 A | | 6/1992 | Larkey ......................... 381/43 |
| 5,418,717 A | * | 5/1995 | Su et al. ......................... 704/9 |
| 5,528,731 A | | 6/1996 | Sachs et al. ............... 395/2.55 |
| 5,568,540 A | | 10/1996 | Greco et al. ............. 379/88.25 |
| 5,617,486 A | | 4/1997 | Chow et al. ................. 382/181 |
| 5,651,054 A | | 7/1997 | Dunn et al. .................... 379/67 |
| 5,717,743 A | | 2/1998 | McMachon et al. ........ 379/188 |
| 5,742,905 A | | 4/1998 | Pepe et al. .................. 455/461 |
| 5,794,192 A | | 8/1998 | Zhao .......................... 704/244 |
| 5,822,405 A | | 10/1998 | Astarabadi .................... 379/88 |
| 5,842,161 A | | 11/1998 | Cohrs et al. ................ 704/251 |
| 5,848,130 A | | 12/1998 | Rochkind ..................... 379/67 |
| 5,937,384 A | * | 8/1999 | Huang et al. ............... 704/256 |
| 6,044,347 A | * | 3/2000 | Abella et al. ............... 704/272 |
| 6,058,363 A | * | 5/2000 | Ramalingam ............... 704/251 |
| 6,181,780 B1 | | 1/2001 | Finnigan ..................... 379/67.1 |
| 6,208,713 B1 | | 3/2001 | Rahrer et al. .............. 379/67.1 |
| 6,219,407 B1 | | 4/2001 | Kanevsky et al. ........ 379/88.02 |
| 6,272,455 B1 | * | 8/2001 | Hoshen et al. .................. 704/1 |
| 6,327,343 B1 | | 12/2001 | Epstein et al. ........... 379/88.01 |
| 6,275,801 B1 | * | 8/2002 | Novak et al. ................ 704/252 |

FOREIGN PATENT DOCUMENTS

JP 10079785 3/1998 ............ H04M/1/57

\* cited by examiner

*Primary Examiner*—Tālivaldis Ivars Šmits
(74) *Attorney, Agent, or Firm*—Haverstock & Owens LLP

(57) ABSTRACT

A stream of input speech is coupled as an input to a speech recognizer. The speech can be provided to the speech recognizer directly from a user or first stored and provided from a memory circuit. Each input word is recognized by the speech recognizer and a word confidence score is associated with each corresponding recognized word. The recognized words and their associated word confidence scores are provided to a natural language interpreter which parses the stream of recognized words into predetermined edges. From the edges, the natural language interpreter forms semantic slots which represent a semantic meaning. A slot confidence score related to the word or phone confidence scores for each of the words in the slot is determined for each slot. Based upon the slot confidence score, an ancillary application program determines whether to accept the words used to fill each slot. If the slot is rejected, the application program can request the user to repeat the information necessary to fill that slot only, rather than requiring the user to repeat the entire stream of input speech.

53 Claims, 1 Drawing Sheet

NATURAL LANGUAGE SPEECH RECOGNITION USING SLOT SEMANTIC CONFIDENCE SCORES RELATED TO THEIR WORD RECOGNITION CONFIDENCE SCORES

This application is a continuation-in-part application of U.S. patent application Ser. No. 08/576,874 filed on Dec. 21, 1995 and entitled METHOD AND SYSTEM FOR BUILDING AND RUNNING NATURAL LANGUAGE UNDERSTANDING SYSTEMS, now U.S. Pat. No. 6,292,764, issued Sep. 18, 2001. This application also claims priority of provisional application serial No. 60/091,047 filed Jun. 29, 1998 entitled METHOD AND APPARATUS FOR PROCESSING AND INTERPRETING NATURAL LANGUAGE IN A VOICE ACTIVATED APPLICATION, invented by Eric I Chao Chang and Eric G. Jackson.

FIELD OF THE INVENTION

This invention relates to the field of interpreting natural language. More particularly, this invention relates to a method and apparatus for processing and interpreting natural language which enhances the operation through the use of semantic confidence values to enhance efficiency.

BACKGROUND OF THE INVENTION

Definitions

The following definitions may be helpful in understanding the background of the invention as it relates to the invention and the discussion outlined below.

Confidence: a measure of a degree of certainty that a system has accurately identified input language. In the preferred embodiment, it is a measure of the degree of perceived acoustic similarity between input speech and an acoustic model of the speech.

Phrase: a sequence of words.
  Example: "from Boston"

Grammar rule: a specification of a set of phrases, plus meaning of those phrases
  Example: (from [(boston ? massachusetts)(dallas ? texas)]
  Generates: "from boston", "from boston Massachusetts", "from dallas", "from dallas texas"

Grammar: a set of grammar rules.

Edge: a match located by a parser of a grammar rule against a phrase contained in an input sentence.
  Example: From the sentence "I want to fly from Boston to Dallas," a parser could create an edge for the phrase "from Boston" using the grammar rule shown above.

Slot: a predetermined unit of information identified by a natural language interpreter from a portion of the natural language input. For example, from the phrase "from Boston" the natural language interpreter might determine that the "origin" slot is to be filled with the value "BOS" (the international airport code for Boston).

Parse tree: a set of edges used in constructing a meaning for an entire sentence.

Example:

```
Sentence
Subject
I
VerbPhrase
Verb
want
complement
InfVerbPhrase
to
fly
PP
Preposition
from
NP
Noun
Boston
PP
Preposition
to
NP
Noun
Dallas
```

THE BACKGROUND DISCUSSION

Natural language interpreters are well known and used for a variety of applications. One common use is for an automated telephone system. It will be apparent to those of ordinary skill in the art that these techniques can and have been applied to a variety of other uses. For example, one could use such a system to purchase travel tickets, to arrange hotel reservations, to trade stock, to find a telephone number or extension, among many other useful applications.

As an example, consider a system for use in providing information about commercial passenger air flights. A caller to the system might say "I want to fly from Boston to San Francisco, tomorrow." This exemplary system requires three pieces of information to provide information about relevant air flights including the origin city, the destination city and the time of travel. Other systems could require more or less information to complete these tasks depending upon the goals of the system. While the exemplary system also uses a speech recognizer to understand the supplied spoken natural language, it could also receive the natural language via other means such as from typed input, or using handwriting recognition.

Using a predetermined grammar with a set of grammar rules, such a system parses the sentence into edges. Each edge represents a particular needed piece or set of information. The sentence can be represented by a parse tree as shown in the definitions above.

In a parsing operation, the system performs the parsing operation by matching grammar rules to the natural language input. For example, one grammar rule that can specify than an origin expression is the word "from" or the phrase "out of" followed by a city name. If the natural language input is "I want to fly from Boston to Dallas:, the system will locate the phrase "from Boston" and create a record in its internal data structures that these words match the origin expression grammar rules. This record is sometimes referred to as an edge. Systems look for predetermined grammars within collections of natural language. The system performs the parsing operation in accordance with the grammar as a way of forming/filling the desired edges with information from a natural language input. For example, the natural language interpreter identifies the initial city by seeking any of several origin city words such as <'from', 'starting', 'leaving', 'beginning', . . . >related to a city name from a list of cities. If the natural language interpreter finds an origin city and a city from the list, it will then fill the origin city edge. Similarly, the natural language interpreter identifies the destination city by seeking any of several destination city words such as <'to', 'ending', 'arriving', 'finishing', . . . >related to a city name from the list of cities. If the natural language interpreter finds a destination city and a predefined city, it will then fill the destination city edge. The grammar for the natural language interpreter similarly identifies the desired time of the flight by seeking any of several time words such as <'o'clock', 'morning', 'afternoon', 'a.m.', 'p.m.', 'January', 'February', . . . , 'Monday', 'Tuesday', . . . >related to a number. Using this technique, the natural language interpreter can interpret spoken utterances if they contain the requisite information, regardless of the ordering of the sentence. Thus, the sentence listed above as "I want to fly from Boston to San Francisco, tomorrow," will provide the same result as the sentence, "Please book a flight to San Francisco, for flying tomorrow, from Boston."

If the natural language interpreter is unable to identify the appropriate words, or a related city name, then the parsing will be terminated as unsuccessful. For example, if the caller says, "I want to fly to visit my mother," the parsing will be unsuccessful. There is no source city word nor source city in the sentence. Further, even though the natural language interpreter finds a destination city word, it cannot find a city name that it recognizes.

For a natural language interpreter used in conjunction with a speech recognition system, the natural language interpreter is provided the speech recognizer's best determination of each word resulting from the recognition operation. A speech recognizer 'listens' to a user's spoken words, determines what those words are and presents those words in a machine format to the natural language interpreter. As part of the recognition operation, each word is provided a word confidence score which represents the confidence associated with each such word that the speech recognizer has for the accuracy of its recognition. Thus, it is generally considered useful to take into account the accent or speech patterns of a wide variety of users. A score is generated and associated with each word in the recognition step. Using the scores for each individual word is not entirely satisfactory because that collection of scores does not relate to the meaning the speaker intends to convey. If a single word has a very low word confidence score, the user may be required to re-enter the request.

In one prior approach, the scores for each of the words are combined into a single composite confidence score for the entire sentence. While this approach solves certain problems associated with using the scores for each word and provides a workable solution, it suffers from several drawbacks.

The composite confidence score described above is weighted by all the words in the entire sentence. In a long sentence, a speaker might use many words that are in essence unrelated to providing the information that the natural language interpreter needs. For example, if the speaker says, "Please help me to arrange a flight tomorrow to visit my friend for their birthday celebration leaving from Minneapolis and arriving in Cleveland." In this example, assume that the speaker talks clearly, so that almost every word has a very high confidence score. A loud background noise occurs during the speaking of the words "Minneapolis" and "Cleveland" so that the confidence score for those two words is low. In fact the speech recognizer incorrectly recognizes one of the words. Nevertheless, because the composite confidence score is high for the entire sentence, the recognition for the sentence is accepted. Thus, the natural language interpreter instructs the system to find the wrong flight information.

On the other hand, even if the critical information is all properly recognized, if the composite confidence score is low, the entire sentence is rejected. For example, the speaker says, "I want to fly tomorrow from Chicago to Phoenix." In this example also assume that the speaker talks clearly. The speech recognizer properly identifies the words, "tomorrow from Chicago to Phoenix." A loud background noise occurs during the speaking of the words, "I want to fly." Those words have a low confidence score. Thus, even though the critical information is accurately recognized this sentence is rejected because the composite confidence score for the sentence is low. Because of the operation of prior systems, the information is rejected and the user is required to again provide all the information. This is inconvenient for the user.

As can be seen, use of a composite confidence score for the entire sentence results in an operation of the system which is not optimal. Under one set of conditions described above, the system will attempt to utilize incorrect information in carrying out its task. Under the other set of conditions described, the system will require the user to re-provide all of the information, i.e., repeat the entire sentence. One scenario provides an incorrect result, the other is inconvenient to the user.

What is needed is a natural language interpreter for use in conjunction with a speech recognizer which provides more accurate results. What is further needed is a natural language interpreter for use in conjunction with a speech recognizer which does not require a user to re-enter information that was correctly received.

SUMMARY OF THE INVENTION

According to the present invention, a stream of input speech is coupled as an input to a speech recognizer. The speech can be provided to the speech recognizer directly from a user or first stored and provided from a memory circuit. Each input word is recognized by the speech recognizer and a word confidence score is associated to with each corresponding recognized word. The recognized words and their associated word confidence scores are provided to a natural language interpreter which parses the stream of recognized words into predetermined edges. From the edges, the natural language interpreter forms semantic slots which represent a semantic meaning. A slot confidence score is determined for each slot. The slot confidence score is used as a basis for determining the confidence to be placed into a particular predetermined semantic meaning. Based upon the slot confidence score, an ancillary application program determines whether to accept the words used to fill each slot. If the slot is rejected, the application program can request the user to repeat the information necessary to fill that slot only, rather than requiring the user to repeat the entire stream of input speech.

While the invention is described in terms of edges and slot confidence scores, it will be apparent to one of ordinary skill in the art that the essence of using slots is to provide a confidence score for a particular meaning. There are a variety of ways that this can be achieved. Nevertheless, the remainder of this patent document will discuss the invention in terms of slot confidence scores. It will be understood that this could be interpreted to mean any semantic meaning.

DETAILED DESCRIPTION OF THE PREFERRED EMBODIMENT

Figure 1:
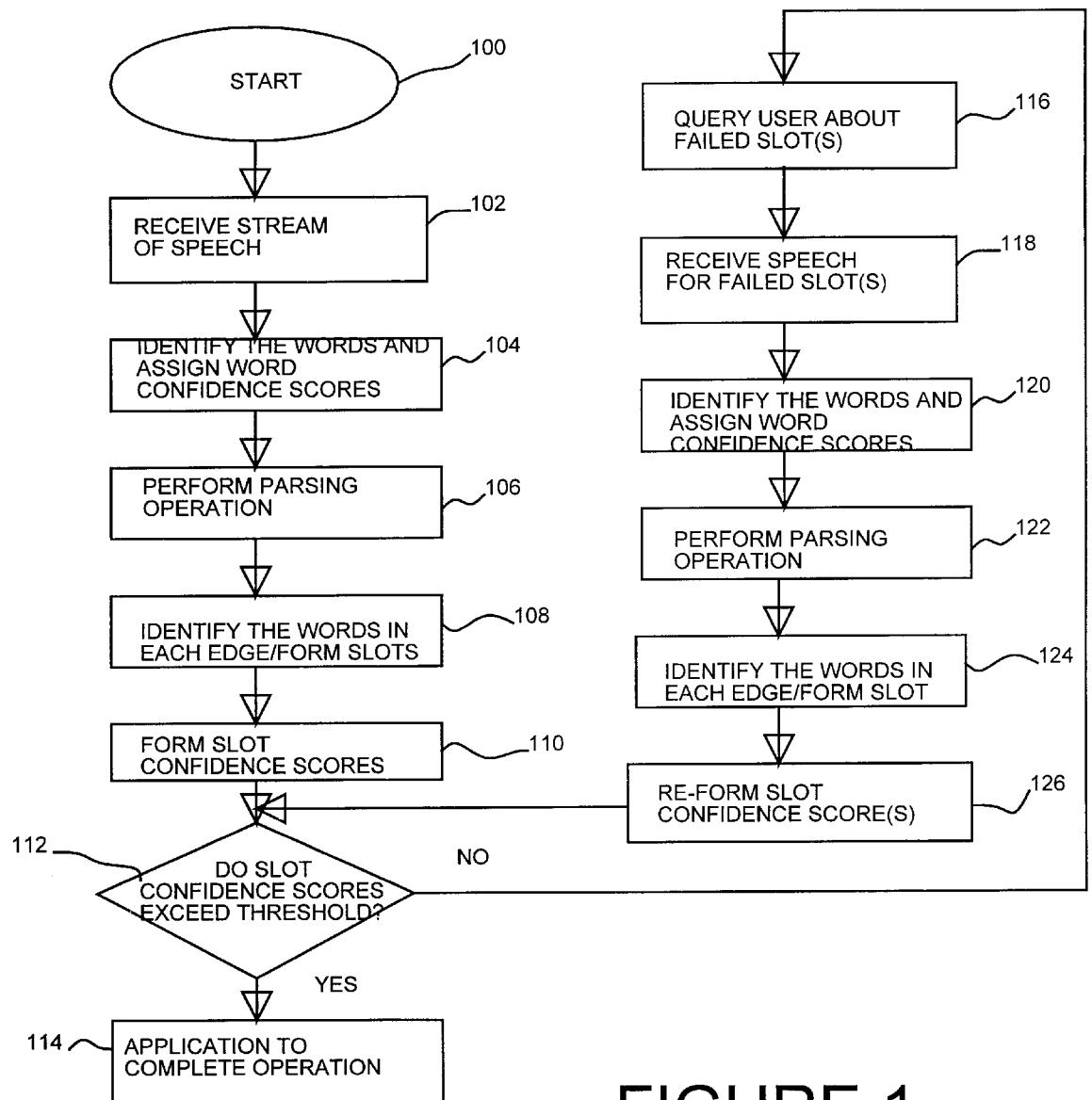
FIG. 1 shows a flow chart of the method of the preferred embodiment.

There are a variety of applications for automated speech systems. Such systems utilize a voice recognizer which receives input speech and determines what words were spoken. The output from the speech recognizer is then provided to a natural language interpreter which then determines what meaning should be attributed to the recognized words. The output of the natural language interpreter is then provided to and utilized by an ancillary applications program. The applications program can be any one of a myriad of well recognized types.

The choice of application is not material to the operation or construction to the present invention. As an aid to understanding the present invention, the example of a system for providing information about commercial passenger air flights is given. The scope of the invention is not intended to be limited to this application. Rather, the invention is directed toward a method of improving the operation of a system which receives a stream of speech, interprets the speech, and then process the natural language for use by the application. In a nutshell, the invention forms a confidence score for each of the several predetermined slot associated with the speech. If the confidence score exceeds a predetermined threshold for all the slot, the application program can then process the language. Otherwise, the application can query the user to clarify only the slot that fails to exceed threshold. Depending upon the circumstances in which the invention is used, more than one threshold value can be selected, with a different threshold used for different slots. Thus slots having varying perceived importance can have varying thresholds to account for their relative importance. This form of conveying information is more like natural human interaction than the prior technique where the entire sentence must be re-spoken by the user.

The invention will be better understood, by considering the steps outlined in the flow chart of FIG. 1. The process begins at the step 100. In the step 102 a stream of input speech is received by a speech recognizer. The speech recognizer can be of a type commercially available. The speech recognizer can be of a type that includes a special purpose hardware system, or could be software running on a general purpose computer. One example of a speech recognizer could be one of the products currently available from Nuance Communications, of Menlo Park, Calif. The input speech could be applied directly to the speech recognizer or it could be stored in a memory. The novel aspects of the invention do not depend upon the exact source of the input speech.

The speech recognizer examines the input speech and makes a conventional determination as to the identity of each word in the input stream in the step 104. Additionally, the speech recognizer assigns a word confidence score to each recognized word. Next, the output of the recognized words and their associated word confidence scores are provided to a natural language interpreter in the step 106. The natural language interpreter can be of a type commercially available. The natural language interpreter can be of a type that includes a special purpose hardware system, or could be software running on a general purpose computer. One example of a natural language interpreter could be one of the products currently available from Nuance Communications, of Menlo Park, Calif. The recognized speech could be applied directly to the natural language interpreter or it could be stored in a memory. The novel aspects of the invention do not depend upon the exact source of the recognized speech.

It will be apparent to one of ordinary skill in the art that the speech recognizer and the natural language interpreter could be constructed in two separate physically distinct systems. According to the preferred embodiment, these two operations are performed in a single general purpose computer running two program sequences, one for speech recognition and another for interpreting natural language. The two program sequences could be two separate programs that operate cooperatively. According to the preferred embodiment, these two programs comprise routines within a single computer program.

The natural language interpreter is configured to operate in conjunction with an application program. The application program is ancillary to the present invention. The application program will define what information it needs to carry out the desired functions. For the example of providing information about commercial passenger air flights utilized in this description, the application program requires the origin city, the destination city and the time of travel. It will be apparent that other applications could require other information. A specification will be used for identifying the required information to the natural language interpreter. Any convenient means can be used for conveying the specification to be communicated to the natural language interpreter. In the preferred embodiment, the specification takes the form of a grammar, which is an input to the natural language interpreter. Alternatively, the natural language interpreter can be modified to include the specification. Or the application program can include the specification wherein the application program and the natural language interpreter include an interface to allow the specification to be communicated to the natural language interpreter. Alternatively, the specification can be included as a discrete software element and include interfaces to both the natural language interpreter and the application program. The specification defines the edges to be filled as a function of the parsing operation of the natural language interpreter. The edges are used to fill the slots.

In the next step 106, the natural language interpreter performs the parsing operation to fill the edges, which in turn are use to form the slots. The natural language interpreter then determines which words are in each slot in the step 108. For each slot, the word confidence scores are combined for all the words in a slot to form a slot confidence score in the step 110. The actual method of combining the word confidence scores can vary according to the application. For example, the word confidence scores can be combined by merely forming a mathematical average of their respective values.

For other systems, certain words can be ascribed more importance so that weighted averaging can be used. In this way the system can be designed to distinguish between words that are merely used to fill a slot from words that are crucial for filling a slot. For example, in selecting a stock in a system used for purchasing stocks, a user might be interested in IBM. The user might utter "International Business Machines Incorporated." All four words contribute to the filling the company name slot but only the first three are necessary words.

To implement this feature, various subsets of words are sent to the natural language interpreter. The natural language interpreter returns the slots that are filled and their value. According to the preferred embodiment, slots are filled with a slot value, eg., the airport code or stock ticker designation. It is possible that the slots could be filled with other information to designate the value such as the actual words. Then smaller subsets of words are systematically sent to the natural language interpreter. The smallest subset of words that can still generate the same slot values are identified as necessary words. As an example, the following subsets are sent to the natural language interpreter:

"international business machines incorporated"→IBM
"international business machines"→IBM
"international machines incorporated"→No parse
"business machines incorporated"→No parse
"international incorporated"→No parse
"international"→No parse
"business"→No parse
"machines"→No parse
"incorporated"→No parse For still other systems, it may be practical to reduce each word that makes up the slot into its fundamental phones. A confidence score can be formed for each phone for each word in the slot and those phone confidence scores can be combined using any convenient technique for form the slot confidence value. It will be apparent to one of ordinary skill in the art that any convenient statistical method can be used to achieve the goals of the present invention.

Next, in the step 112 the slot confidence scores are examined to determined whether they exceed a threshold established by the specification. If each slot confidence score exceeds the threshold, the information in the slot is used by the application program as appropriate; for example a schedule of relevant flights is provided to the user in the step 114.

If the threshold is not exceeded for one or more slot, that slot fails to achieve an acceptable confidence level. The application program can not use the information in that slot. Unlike prior systems, the user need not provide the entire sentence or set of information. Rather, the user is automatically queried in the step 116 in an attempt to re-acquire the speech related to the failed slot. In the preferred embodiment, the application program includes the software to generate the query. However, it will be apparent that the natural language interpreter could include this function. The speech recognizer receives the new speech related only to the failed slot or slots in the step 118. Thereafter, in the step 120 the speech recognizer identifies the words and assigns word confidence score to the new words. The information is provided to the natural language interpreter which parses the words in the step 122. It may be possible to eliminate this step if only a single slot was filled. The words for each failed slot are identified in the step 124. A slot confidence score is formed for each of the failed slots in the step 126. Thereafter, the flow returns to the step 112.

Such a system can be used as follows. A user calls the system to learn about passenger air flights from Boston to Phoenix. The user says, "I want to fly on the third of May from Boston to Phoenix." For some reason, the speech recognizer has difficulty understanding the word Phoenix and assigns a low word confidence score to that word. The score is so low that the slot confidence score for the destination city slot is below the acceptable threshold. The application program fills the two slots for which is has information, namely origin city and time, but does not know the destination city. The application program can be configured to generate speech and ask the user to repeat that information. For example, the application program can say, "It is understood that you wish to fly from Boston on May 3. To which city do you wish to travel?" The user might say "to Phoenix." However, the application program expects only destination city information. Thus, it does not need a word to properly fill the slot. Indeed, the user might only say "Phoenix" in response to the application program query.

Similarly, the user might simply fail to supply information. For example, the user might call and say "I want to fly to Phoenix on May 3." Here the natural language interpreter can fill two of the slots. The origin city slot is empty. The application might be programmed to say "In which city to you wish to begin your flight?"

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. It will be apparent that the various aspects of the above-described invention can be utilized singly or in combination with one or more of the other aspects of the invention described herein. In addition, the various elements of the present invention could be substituted with other elements.

What is claimed is:

1. A method of interpreting natural language received as speech comprising the steps of:

a. receiving a plurality of recognized words, wherein each recognized word has a word confidence score;

b. parsing the recognized words and deriving at least one unit of information regarding a predetermined subject; and c. forming a semantic confidence score for each unit of information, wherein the semantic confidence score is related to the word confidence scores for each of the words that unit of information is derived from.

2. A method of interpreting natural language received as speech comprising the steps of:

a. receiving a plurality of recognized words, wherein each recognized word has a word confidence score;

b. parsing the recognized words and then forming at least one unit of information, wherein the recognized words in each unit of information comprise information regarding a predetermined subject; and c. forming a semantic confidence score for each unit of information, wherein the semantic confidence score is related to the word confidence scores for each of the words in that unit of information.

3. The method according to claim 2 wherein each unit of information comprises a slot.

4. The method according to claim 3 wherein each slot is filled with a slot value.

5. The method according to claim 3 further comprising the step of varying the recognized words in each unit of information to determine a crucial word for filling a slot.

6. The method according to claim 3 wherein each slot is filled with the words for that unit of information.

7. The method according to claim 2 further comprising the step of varying the recognized words in each unit of information to determine a crucial word for filling a unit of information.

8. The method according to claim 2 further comprising the step of determining whether any semantic confidence score fails to exceed a predetermined threshold.

9. The method according to claim 8 wherein each unit of information can have a unique predetermined threshold.

10. The method according to claim 8 further comprising the step of querying a user regarding information from a failed unit of information.

11. The method according to claim 2 wherein the step of parsing is performed in accordance with a grammar having a predetermined set of grammar rules.

12. A method of interpreting natural language received as speech comprising the steps of:
   a. receiving a plurality of recognized words, wherein each recognized word has a word confidence score;
   b. parsing the recognized words and then forming at least one unit of information, wherein the recognized words in each unit of information comprise information regarding a predetermined subject; and
   c. forming a semantic confidence score for each unit of information, wherein the semantic confidence score is related to a confidence associated with the phones for each of the words in that unit of information.

13. The method according to claim 12 wherein each unit of information comprises a slot.

14. The method according to claim 13 wherein each slot is filled with a slot value.

15. The method according to claim 13 wherein each slot is filled with the words for that unit of information.

16. The method according to claim 12 further comprising the step of determining whether any confidence score fails to exceed a predetermined threshold.

17. The method according to claim 16 wherein each unit of information can have a unique predetermined threshold.

18. The method according to claim 16 further comprising the step of querying a user regarding information from a failed unit of information.

19. The method according to claim 12 wherein the step of parsing is performed in accordance with a grammar having a predetermined set of grammar rules.

20. A method of interpreting natural language comprising the steps of:
   a. providing a speech recognizer to receive an input stream of speech from a user and to provide a stream of recognized words therefrom, wherein each recognized word has a word confidence score;
   b. providing a natural language interpreter to receive the stream of recognized words, wherein each word is associated with its word confidence score;
   c. using the natural language interpreter to parse the stream of recognized words into a plurality of units of information in accordance with predetermined grammar rules; and
   d. forming a semantic confidence score for each unit of information, wherein the semantic confidence score is related to the word confidence scores for each of the words in that unit of information.

21. The method according to claim 20 wherein each unit of information comprises a slot.

22. The method according to claim 21 wherein each slot is filled with a slot value.

23. The method according to claim 21 wherein each slot is filled with the words for that unit of information.

24. The method according to claim 20 further comprising the step of determining whether any semantic confidence score fails to exceed a predetermined threshold.

25. The method according to claim 24 wherein each unit of information can have a unique predetermined threshold.

26. The method according to claim 24 further comprising the step of querying a user regarding information from a failed unit of information.

27. A method of interpreting natural language received as speech comprising the steps of:
   a. receiving a stream of input speech from a user;
   b. storing the input speech in a memory circuit forming a stored speech;
   c. providing the stored speech to a speech recognition system for generating a stream of recognized words;
   d. forming a word confidence score for each of the recognized words;
   e. providing the recognized words and their associated word confidence score to a natural language interpreter;
   f. parsing the recognized words into a plurality of units of information, wherein the recognized words in each unit of information comprise information regarding a predetermined subject;
   g. forming a semantic confidence score for each unit of information, wherein the semantic confidence score is related to the word confidence scores for each of the words in that unit of information;
   h. determining whether any semantic confidence score fails to exceed a predetermined threshold; and
   i. querying the user regarding information from a failed unit of information.

28. A method of interpreting natural language received as speech comprising the steps of:
   a. receiving a stream of input speech from a user;
   b. providing the stored speech to a speech recognition system for generating a stream of recognized words;
   c. forming a word confidence score for each of the recognized words;
   d. providing the recognized words and their associated word confidence score to a natural language interpreter;
   e. parsing a value for the recognized words into a plurality of slots, wherein the recognized words in each slot comprise information regarding a predetermined subject;
   f. forming a semantic confidence score for each slot, wherein the semantic confidence score is related to the word confidence scores for each of the words in that slot;
   g. determining whether any semantic confidence score fails to exceed a predetermined threshold; and
   h. querying the user regarding information from a failed slot.

29. An apparatus for interpreting natural language received as speech comprising the steps of:
   a. means for receiving a plurality of recognized words, wherein each recognized word has a word confidence score;
   b. means for parsing a value for the recognized words into at least one slot, wherein the values in each slot comprise information regarding a predetermined subject; and
   c. means for forming a semantic confidence score for each slot, wherein the semantic confidence score is related to the word confidence scores for each of the words in that slot.

30. The apparatus according to claim 29 further comprising means for determining whether any semantic confidence score fails to exceed a predetermined threshold.

31. The method according to claim 30 wherein each slot can have a unique predetermined threshold.

32. The apparatus according to claim 30 further comprising means for querying a user regarding information from a failed slot.

33. The apparatus according to claim 29 wherein the means for parsing works in accordance with a grammar having a predetermined set of grammar rules.

34. An apparatus for interpreting natural language received as speech comprising the steps of:
   a. means for receiving a plurality of recognized words, wherein each recognized word has a word confidence score;
   b. means for parsing a value for the recognized words into at least one slot, wherein the values in each slot comprise information regarding a predetermined subject; and
   c. means for forming a semantic confidence score for each slot, wherein the semantic confidence score is related to confidence score associated with the phones for each of the words in that slot.

35. The apparatus according to claim 34 further comprising means for determining whether any semantic confidence score fails to exceed a predetermined threshold.

36. The method according to claim 35 wherein each slot can have a unique predetermined threshold.

37. The apparatus according to claim 35 further comprising means for querying a user regarding information from a failed slot.

38. The apparatus according to claim 34 wherein the means for parsing works in accordance with a grammar having a predetermined set of grammar rules.

39. An apparatus for interpreting natural language comprising:
   a. a speech recognizer for receiving an input stream of speech from a user and for providing a stream of recognized words therefrom, wherein each recognized word has a word confidence score;
   b. a natural language interpreter for receiving the stream of recognized words, wherein each word is associated with its word confidence score;
   c. the natural language interpreter further comprising means for parsing values for the stream of recognized words into a plurality of slots in accordance with predetermined grammar rules; and
   d. means for forming a semantic confidence score for each slot, wherein the semantic confidence score is related to the word confidence scores for each of the words in that slot.

40. The apparatus according to claim 39 further comprising means for determining whether any semantic confidence score fails to exceed a predetermined threshold.

41. The apparatus according to claim 40 further comprising means for querying a user regarding information from a failed slot.

42. An apparatus for interpreting natural language received as speech comprising the steps of:
   a. means for receiving a stream of input speech from a user;
   b. means for storing the input speech in a memory circuit forming a stored speech;
   c. means for providing the stored speech to a speech recognition system for generating a stream of recognized words;
   d. means for forming a word confidence score for each of the recognized words;
   e. means for providing the recognized words and their associated word confidence score to a natural language interpreter;
   f. means for parsing values for the recognized words into a plurality of slots, wherein the recognized words in each slot comprise information regarding a predetermined subject;
   g. means for forming a semantic confidence score for each slot, wherein the semantic confidence score is related to the word confidence scores for each of the words in that slot;
   h. means for determining whether any semantic confidence score fails to exceed a predetermined threshold; and
   i. means for querying the user regarding information from a failed slot.

43. An apparatus for interpreting natural language received as speech comprising the steps of:
   a. means for receiving a stream of input speech from a user;
   b. means for providing the stored speech to a speech recognition system for generating a stream of recognized words;
   c. means for forming a word confidence score for each of the recognized words;
   d. means for providing the recognized words and their associated word confidence score to a natural language interpreter;
   e. means for parsing values for the recognized words into a plurality of slots, wherein the recognized words in each slot comprise information regarding a predetermined subject;
   f. means for forming a semantic confidence score for each slot, wherein the semantic confidence score is related to the word confidence scores for each of the words in that slot;
   g. means for determining whether any semantic confidence score fails to exceed a predetermined threshold; and
   h. means for querying the user regarding information from a failed slot.

44. A method of interpreting natural language received as speech comprising the steps of:
   a. receiving a plurality of recognized words, wherein each recognized word has a word confidence score;
   b. parsing the recognized words and then forming at least one slot, wherein the recognized words in each slot comprise information regarding a predetermined subject; and
   c. forming a slot confidence score for each slot, wherein the slot confidence score is related to the word confidence scores for each of the words in that slot.

45. A method of interpreting natural language received as speech comprising the steps of:
   a. receiving a plurality of recognized words, wherein each recognized word has a word confidence score;
   b. parsing the recognized words and then forming at least one slot, wherein the recognized words in each slot comprise information regarding a predetermined subject; and
   c. forming a slot confidence score for each slot, wherein the slot confidence score is related to a confidence associated with the phones for each of the words in that slot.

46. A method of interpreting natural language comprising the steps of:
   a. providing a speech recognizer to receive an input stream of speech from a user and to provide a stream of recognized words therefrom, wherein each recognized word has a word confidence score;

b. providing a natural language interpreter to receive the stream of recognized words, wherein each word is associated with its word confidence score;

c. using the natural language interpreter to parse the stream of recognized words into a plurality of slots in accordance with predetermined grammar rules; and d. forming an slot confidence score for each slot, wherein the slot confidence score is related to the word confidence scores for each of the words in that slot.

47. A method of interpreting natural language received as speech comprising the steps of:

a. receiving a stream of input speech from a user;

b. storing the input speech in a memory circuit forming a stored speech;

c. providing the stored speech to a speech recognition system for generating a stream of recognized words;

d. forming a word confidence score for each of the recognized words;

e. providing the recognized words and their associated word confidence score to a natural language interpreter;

f. parsing the recognized words into a plurality of slots, wherein the recognized words in each slot comprise information regarding a predetermined subject;

g. forming an slot confidence score for each slot, wherein the slot confidence score is related to the word confidence scores for each of the words in that slot;

h. determining whether any slot confidence score fails to exceed a predetermined threshold; and i. querying the user regarding information from a failed slot.

48. A method of interpreting natural language received as speech comprising the steps of:

a. receiving a stream of input speech from a user;

b. providing the stored speech to a speech recognition system for generating a stream of recognized words;

c. forming a word confidence score for each of the recognized words;

d. providing the recognized words and their associated word confidence score to a natural language interpreter;

e. parsing the recognized words into a plurality of slots, wherein the recognized words in each slot comprise information regarding a predetermined subject;

f. forming an slot confidence score for each slot, wherein the slot confidence score is related to the word confidence scores for each of the words in that slot;

g. determining whether any slot confidence score fails to exceed a predetermined threshold; and h. querying the user regarding information from a failed slot.

49. An apparatus for interpreting natural language received as speech comprising the steps of:

a. means for receiving a plurality of recognized words, wherein each recognized word has a word confidence score;

b. means for parsing the recognized words into at least one slot, wherein the recognized words in each slot comprise information regarding a predetermined subject; and c. means for forming an slot confidence score for each slot, wherein the slot confidence score is related to the word confidence scores for each of the words in that slot.

50. An apparatus for interpreting natural language received as speech comprising the steps of:

a. means for receiving a plurality of recognized words, wherein each recognized word has a word confidence score;

b. means for parsing the recognized words into at least one slot, wherein the recognized words in each slot comprise information regarding a predetermined subject; and c. means for forming an slot confidence score for each slot, wherein the slot confidence score is related to confidence score associated with the phones for each of the words in that slot.

51. An apparatus for interpreting natural language comprising:

a. a speech recognizer for receiving an input stream of speech from a user and for providing a stream of recognized words therefrom, wherein each recognized word has a word confidence score;

b. a natural language interpreter for receiving the stream of recognized words, wherein each word is associated with its word confidence score;

c. the natural language interpreter further comprising means for parsing the stream of recognized words into a plurality of slots in accordance with predetermined grammar rules; and d. means for forming an slot confidence score for each slot, wherein the slot confidence score is related to the word confidence scores for each of the words in that slot.

52. An apparatus for interpreting natural language received as speech comprising the steps of:

a. means for receiving a stream of input speech from a user;

b. means for storing the input speech in a memory circuit forming a stored speech;

c. means for providing the stored speech to a speech recognition system for generating a stream of recognized words;

d. means for forming a word confidence score for each of the recognized words;

e. means for providing the recognized words and their associated word confidence score to a natural language interpreter;

f. means for parsing the recognized words into a plurality of slots, wherein the recognized words in each slot comprise information regarding a predetermined subject;

g. means for forming an slot confidence score for each slot, wherein the slot confidence score is related to the word confidence scores for each of the words in that slot;

h. means for determining whether any slot confidence score fails to exceed a predetermined threshold; and i. means for querying the user regarding information from a failed slot.

53. An apparatus for interpreting natural language received as speech comprising the steps of:

a. means for receiving a stream of input speech from a user;

b. means for providing the stored speech to a speech recognition system for generating a stream of recognized words;

c. means for forming a word confidence score for each of the recognized words;
d. means for providing the recognized words and their associated word confidence score to a natural language interpreter;
e. means for parsing the recognized words into a plurality of slots, wherein the recognized words in each slot comprise information regarding a predetermined subject;
f. means for forming an slot confidence score for each slot, wherein the slot confidence score is related to the word confidence scores for each of the words in that slot;
g. means for determining whether any slot confidence score fails to exceed a predetermined threshold; and
h. means for querying the user regarding information from a failed slot.

* * * * *

UNITED STATES PATENT AND TRADEMARK OFFICE
CERTIFICATE OF CORRECTION

PATENT NO. : 6,567,778 B1
DATED : May 20, 2003
INVENTOR(S) : Eric Chao Chang et al.

It is certified that error appears in the above-identified patent and that said Letters Patent is hereby corrected as shown below:

Title page,
Item [63], Related U.S. Application Data, replace "Continuation-in-part of application No. 08/576,874, filed on Dec. 21, 1995, now Pat. No. 6,292,764." with
-- Continuation-in-part of application No. 08/576,874, filed on Dec. 21, 1995, now Pat. No. 6,292,767. --

Column 1,
Line 12, replace "now U.S. Pat. No. 6,292,764" with -- now U.S. Pat. No. 6,292,767 --.

Signed and Sealed this

Seventh Day of October, 2003

JAMES E. ROGAN
*Director of the United States Patent and Trademark Office*